May 31, 1932.  G. HILGER  1,861,158
AIR CONDITIONING SYSTEM
Filed Jan. 6, 1930

Inventor:
George Hilger,
By Chindell Parker Carlson
Attys.

Patented May 31, 1932

1,861,158

UNITED STATES PATENT OFFICE

GEORGE HILGER, OF CHICAGO, ILLINOIS

AIR CONDITIONING SYSTEM

Application filed January 6, 1930. Serial No. 418,673.

This invention relates to humidity regulation in a temperature control system, and more particularly to the automatic control of humidity in such a system.

In the refrigeration of food products, especially those, such as meat, which contain a large percentage of water, much difficulty is experienced in preventing evaporation and loss of weight. This difficulty is overcome by maintaining the cooled air coming in contact with the products slightly below the point of saturation of the air at the temperature in the compartment where the products are stored. With the air thus conditioned, evaporation of moisture from the food products is minimized because the air is laden with practically all the water vapor that it is capable of carrying and deposition of moisture on the products is prevented because the air is not super-saturated by the presence of mechanically suspended moisture.

Systems of spray cooling, that is, systems wherein the air is chilled by a spray cooled liquid, are often used in food refrigeration because of their high cooling efficiency and their ability to maintain high degrees of saturation of the air. In such systems difficulty has been experienced in preventing some of the cooling liquid from being carried forward with the spray cooled air into the food storage compartment and there deposited on the food products. The super-saturation, resulting in deposition of moisture on the products, is caused by lack of opportunity for the mechanically suspended and entrained liquid particles to settle out before leaving the spray compartment. To avoid such super-saturation of the air a suitable means for dehydrating the air may be employed. This dehydration must be carefully regulated to obtain satisfactory results.

The primary object of the present invention, therefore, is to provide in combination with a spray system for cooling air, an improved and more effective regulating means by which the degree of saturation of the cooled air may be automatically maintained at a predetermined point.

Another object of the invention is to provide in combination with a refrigeration system wherein a brine solution is used as the spray, a simplified and improved means for automatically maintaining the concentration of the solution constant.

Other objects and advantages of the invention will become apparent from the following detailed description taken in connection with the accompanying drawings in which.

Figure 1:
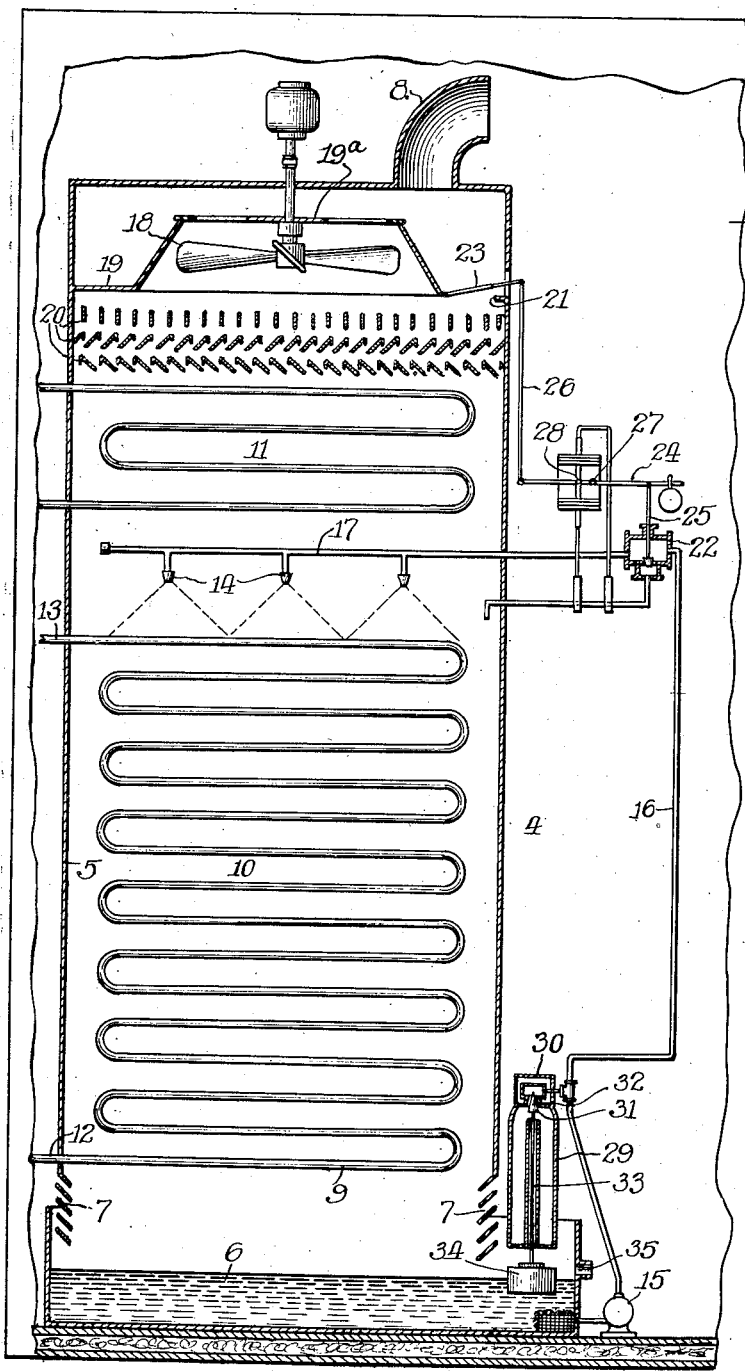
Fig. 1 is a sectional elevational view of a food storage compartment and a spray refrigerating unit embodying the features of the present invention.
Figure 2:
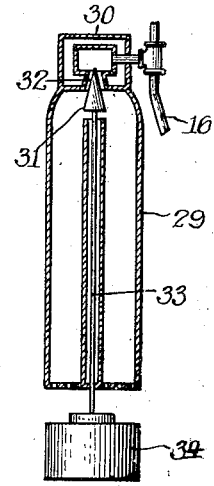
Fig. 2 is an enlarged sectional view of the brine compensating unit.

While the invention is susceptible of various modifications and alternative constructions I have shown and herein described in detail the preferred embodiment, but it is to be understood that I do not thereby intend to limit the invention to the specific form disclosed but intend to cover all modifications and alternative constructions falling within the spirit and scope of the invention as expressed in the appended claims.

In the exemplary embodiment, the invention is illustrated as applied to the control of humidity in a storage compartment 3 having a refrigerating unit 4 located therein.

The refrigerating unit 4 comprises an elongated closed tank 5 of suitable shape having as herein shown its longitudinal axis vertically disposed. The bottom of the tank 5 constitutes a brine reservoir 6 and has a portion extending beyond the side walls of the tank proper. Openings 7 in the side walls just above the level of the reservoir 6 afford intake passages for the air to be cooled, which air is later discharged through a duct 8 at the top of the tank 5. Thus the tank constitutes a cooling compartment which communicates at opposite ends with the cooler-room or storage compartment in which foods are intended to be placed.

Reduction in the temperature of the air circulated is obtained by contact with cooling coils 9 mounted in the tank 5 and disposed in the path of the circulated air. The coils are grouped into two distinct sections of which a lower section 10 contains a larger percentage of the coils and is spaced from an upper section 11. The lower section 10 is permanently connected at the ends 12 and 13 of the coils to any preferred source of cooling agent such as a compression type of refrigerating unit. Connection of the upper section 11 of coils is dependent upon atmospheric temperature conditions and may be made with either a cooling agent or a heating agent.

Located between the two sections of coils and directed downwardly is a bank of nozzles 14 which are supplied with brine under pressure by means of a motor driven brine pump 15. The brine is circulated from the reservoir in the bottom of the tank 5 by the brine pump 15 through a conduit 16 to a header 17 of the nozzles where it is ejected into the tank 5 in the form of a spray. In this form the brine provides intimate contact surface for a large portion of the air circulated thereby cooling and super-saturating the air by the entrainment of mist particles. The spray also serves to increase the efficiency of heat transfer from the air to the coils 9 by preventing frosting of the coils.

To cool the food storage compartment, air is drawn into the tank 5 through the louvered openings 7, then upward against the action of gravity and the sprays by a motor driven fan 18 located in the uppermost portion of the tank. A partition 19 in the plane of the bottom of the fan 18 has a central opening through which the air normally passes into the fan. The fan 18 is journaled in a cross-member 19a positioned diametrically of the opening in the partition 19.

The large wetted surface of the coils and the spray thoroughly cool and saturate the air as it passes upward. After passing the spray nozzles 14 the air contacts with the upper section 11 of the coils, which may be termed dehydrating coils, whose function when connected to a cooling agent, is to remove excessive moisture in the air. This dehydration may be considered as being caused by the action of the coils as a baffle in interrupting the flow of air, and also to the tendency of the particles of mist to coagulate and settle out when they become cooled in the zone surrounding about the coils. A series of baffles 20, of which the lower rows are metallic and the upper row is of a moisture absorbing material, aid the dehydrating coils in their work. The absorbing material serves to hold moisture to compensate for any increase in the temperature of the air resulting from the passage through the baffles.

From the foregoing it will be seen that the upper section 11 of dehydrating coils acts as a secondary cooling means, and that the further cooling of the air effected thereby serves to remove mechanically suspended moisture in the spray cooled air provided sufficient time is allowed for coagulation and settling out of the liquid particles in passing through the cooling zone. The ideal condition is reached when the air leaves the refrigerating unit with such an amount of moisture that when the air is raised to the temperature of the products which are being refrigerated its relative humidity will be slightly less than 100%. Under these conditions very little moisture will be absorbed from the products and there is no danger of deposition of brine on the products.

It is apparent that the temperature in the food storage compartment will vary depending upon conditions. If the door is repeatedly opened or new products, such as freshly killed meat, are put in, the temperature will be materially higher than after a period during which the doors have been maintained closed. Thus if the dehydrating means remove sufficient moisture to properly condition the air when the storage compartment is at a high temperature, the decreased capacity of the air to hold moisture at a lower temperature will cause the air to be super-saturated at that lower temperature. Under this condition the air would deposit moisture or brine upon the products. Under the reverse condition moisture would be absorbed from the products and it is evident that to eliminate either result, means must be provided for rapidly varying the moisture content of the air entering the storage compartment.

Much of the moisture which deposits out on the food products is composed of large particles of spray which are carried in the air stream because of the high velocity at which the air passes through the cooling compartment. This high velocity of the air also prevents the upper section 11 of coils and the baffles 20 from effectively reducing the humidity of the air by further cooling and coagulation.

To obviate the above mentioned difficulties, automatically acting means are provided for reducing the velocity at which the air passes through the cooling compartment. This is accomplished by recirculating a portion of the air through an opening 21 in the partition 19 and increasing the pressure of the spray nozzles 14. In this manner the suction of the fan effective to draw air into the cooling compartment through the openings 7 is reduced and the increased velocity of the sprays increases the downward force acting on the air drawn into the cooling compartment through those openings. The decrease in the velocity of the air relative to the cooling compartment effected in this manner reduces the quantity of mist particles carried by the air current and also increases the length of time of exposure to the dehydrating coils 11. Not only is the velocity decreased but the air is by-passed relative to the sprays and recirculated without opportunity for entrainment of additional moisture.

In the present instance the pressure at the nozzles is controlled by a valve 22 interposed in the conduit 16 which connects the brine pump 15 and the nozzle header 17. The valve when opened constitutes a means for by-passing into the tank a portion of the liquid forced through the supply pipe under pressure. Consequently the pressure at the nozzles will be varied by opening and closing the valve 22, and will be greatest when the valve is closed. The pressure at the spray nozzles may thus be varied as desired to aid in maintaining the proper humidity without interfering with the operation of the pump 15.

The means for regulating the volume of air to be recirculated consists of a damper 23 which governs the effective size of the opening 21 in the partition 19. When the damper 23 is opened a portion of the air which has passed through the fan is drawn by the pressure difference on the opposite sides of the fan, downward through the opening 21 in the partition 19. It is then drawn into the main upward current of air and again passes through the fan thus decreasing the volume of air drawn through the cooling compartment. This is an extremely effective manner of reducing the velocity and requires the recirculation of but a small volume of air.

The means provided for actuating the valve 22 and the damper 23 in accordance with the humidity conditions of the air in the storage compartment 3, comprises a suitable "wet" and "dry" bulb humidostat. To actuate the valve 22 and the damper 23 according to the difference in the "wet" and "dry" bulb temperatures, which difference is the measure of the relative humidity of the air, a lever 24 is connected, on opposite sides of the fulcrum, to the valve stem 25 and to the link 26 which is connected at its other end to the damper 23. The lever 24 is fulcrumed at 27 on a double diaphragm actuator unit and pivotally connected at 28 to the rigid member connecting the two diaphragms. Both bulbs and the corresponding chambers of the diaphragm actuator unit are filled with gas which constitutes a thermostatic medium by which the diaphragms are moved and maintained in balanced relation.

It will be seen that the valve and the damper are connected to operate in the same manner. When the valve is closed to increase the nozzle pressure the damper is opened to permit recirculation of the air and vice versa. The two means thus act in series to increase or decrease the velocity of the air current in the cooling compartment and thus provide a very effective control over the humidity at which the air leaves the tank. Under the present arrangement the velocity will be decreased when the temperature difference between the "wet" and "dry" bulbs decreases; and will be increased when the temperature difference increases. A weight may be adjusted along the lever 24 to change the setting of the valve and the damper thus permitting any desired relative humidity to be maintained.

Loss of a small quantity of the brine salt in the continued operation of the apparatus is unavoidable. In preventing excessive deposit of the brine, it is desirable to keep the moisture content of the cooled air slightly below the quantity required to result in 100 per cent relative humidity when the air is raised to the temperature of the storage compartment. This will result in slight evaporation of moisture from the food products and means that the air returns to the tank 5 containing more moisture than when it leaves. Contact with the coils 9 and the consequent reduction in temperature causes a portion of this moisture to be condensed out. This moisture, normally forming on the coils in the form of frost or snow is melted by the spray and carried into the reservoir at the bottom of the tank 5 thereby diluting the brine solution.

In order to maintain the proper brine concentration a cylindrical container 29 in the form of an annulus is provided which has a perforated bottom and an opening at the top. The container 29 is positioned above that portion of the reservoir 6 external of the tank 5. At its upper end the container 29 is permanently connected by a casing 30 to the nozzle supply line. A needle valve 31 coacts with the valve seat 32 in the bottom wall of the casing 30 and is mounted on one end of a long valve stem 33 which extends through the inner cylinder of the container 29 and is attached at its other end to a float 34. The float is buoyed up by the brine solution and controls the flow of brine through the container 29 by means of the valve.

The brine in the reservoir 6 is maintained at a constant level by means of an over-flow outlet 35 in the side wall of the tank 5 and the float 34 is thus buoyed up in proportion to the specific density of the solution. Thus when the brine solution has been diluted the float sinks lower into the brine and the valve 31 is opened allowing brine to flow from the casing 30 through the container and carry with it some of the salt placed in the container for that purpose. The flow through the container is maintained until the brine is again concentrated enough to buoy up the float and close the needle valve. Any desired concentration of the brine may be maintained by placing the proper weights on the float 34.

The operation of the refrigerating unit is briefly as follows. When the conditions in the storage compartment are about normal, the damper 23 in the partition 19 and the by-pass valve 22 are both partially open. Refrigerant is being supplied to both sections of the coils 9 and the air which is drawn by the fan 18 through the openings 7 in the lower portion of the tank 5 is cooled by contact with the coils and humidified by the spray from the nozzles. In its passage through the spray, the air entrains and mechanically holds mist and large spray particles, some of which are condensed out by contact with the upper section of coils and coagulation in the baffles 20. The portion of air recirculated, which varies the suction of the fan effective to draw air into the cooling compartment, and the velocity of the sprays, are so regulated by the humidity responsive means, that the velocity of the air current is changed rapidly and in a manner such that the amount of moisture entrained and the length of time of exposure of the air to the dehydrating means properly conditions the air for the temperature in the storage compartment.

If the temperature of the storage compartment is suddenly raised the humidostat operates to close the opening 21 in the partition 19 and open the valve 22. The velocity at which the air is then drawn through the cooling compartment is materially increased, thereby increasing the amount of mechanically entrained moisture and decreasing the quantity of moisture condensed because of the shortened time of exposure to the dehydrating coils. The absolute humidity of the air is thus much greater and compensates for the increased capacity of the air to hold moisture caused by the rise in temperature. The degree by which the absolute humidity of the air leaving the cooling compartment may be varied in this manner is so great that the entire storage compartment is soon brought to the proper humidity condition, yet the control obtained by the combined action of opposing the upward force of the fan by the force of the spray and regulating the volume of air by recirculation is very sensitive and delicate.

As the air is maintained at a relative humidity of approximately 95 to 97 per cent when raised to the temperature of the storage compartment, it absorbs a small amount of moisture from the storage compartment which is condensed and is caused to drop out when the air returns to the cooling compartment. The decrease in the specific density of the solution, caused by the additional moisture, allows the float to drop slightly and thereby permits additional salt to be carried into the brine as previously stated.

The apparatus has been described primarily for use as a cooling means but that it is not limited to this function has been briefly mentioned above. When the temperature conditions of the atmosphere are such as would cause the products in the storage compartment to freeze, the apparatus may be used with equal success as a warming means. To accomplish this the lower section 10 of coils are disconnected and the upper section 11 is connected to a source of heat supply.

I claim as my invention:

1. In a system of the character described, the combination of a storage compartment, an air conditioning compartment communicating with said storage compartment, means for circulating air through said compartments, means for humidifying the air circulated, and means responsive to humidity changes in the storage compartment for by-passing within said air conditioning compartment and relative to said humidifying means a portion of the air circulated.

2. In a system of the character described, the combination of a storage compartment, a cooling compartment communicating with said storage compartment, means for circulating air through said compartments, means for cooling and humidifying the air circulated, means for dehydrating said air, by-pass means for re-circulating said dehydrated air through said dehydrating means but relative to both said storage compartment and said humidifying means, and means for controlling said by-pass means.

3. In a system of the character described, the combination with a storage compartment, a cooling compartment communicating with said storage compartment, means for circulating air through said compartments, means for spraying a liquid cooling medium into the air current, means for dehydrating said cooled air, and means for regulating the moisture content of the air entering the storage compartment including a humidostatically controlled means for by-passing within said cooling compartment a portion of said air relative to said spraying means, said by-passed air recirculating through said dehydrating means.

4. In a system of the character described, the combination of a storage compartment, a cooling compartment communicating with said storage compartment comprising an elongated tank, an apertured partition in the top of said tank, a fan in the aperture of said partition drawing air through said tank, means for cooling and humidifying the air in its passage through the tank, means for removing excess moisture in the air, a damper controlled opening in said partition spaced from said fan, and means responsive to the humidity changes for varying the velocity of the air in said cooling compartment by controlling the amount of air re-circulated through said damper-controlled opening thereby regulating the relative humidity of the air passing into the storage compartment.

5. In a system of the character described, the combination of a storage compartment, a cooling compartment communicating with a storage compartment, a fan in the upper portion of said cooling compartment for circulating air therethrough, means for cooling the air circulated, and humidostatically controlled means for opposing the action of said fan to vary the velocity of the air current in said cooling compartment.

6. In a system of the character described, the combination of a storage compartment, a cooling compartment communicating with said storage compartment, a fan in said cooling compartment for circulating air through said compartments, a spray nozzle positioned in said cooling compartment to oppose the action of said fan, means supplying brine to said nozzle under pressure and humidity responsive means including a brine by-pass valve for controlling the velocity of the air current in the cooling compartment.

7. In a system of the character described, the combination with a storage compartment, a cooling compartment communicating with said storage compartment, a fan in the cooling compartment for circulating air through said compartment, means for spraying a liquid cooling medium into the air current in a direction opposed thereto, and means for varying the velocity of the air current to regulate the moisture content of the air entering the storage compartment including a humidostatically controlled means for regulating the velocity of the cooling medium sprayed and for by-passing a portion of said air circulated relative to said cooling compartment.

8. In a brine spray refrigeration system, the combination with a storage compartment, a cooling compartment communicating with said storage compartment, means for circulating air through said compartments, a spray nozzle positioned in the cooling compartment, a brine reservoir in the bottom of said cooling compartment which is kept at a constant level, means for supplying brine from said reservoir to said nozzle under pressure, and means for maintaining a predetermined specific density of the brine solution comprising a salt filled container positioned over said reservoir and having a perforated bottom, a connection between said container and the nozzle supply line, a needle valve governing said connection, and a float buoyed by the brine solution and operable upon variation of the specific density of the brine solution to open and close said needle valve, whereby said brine is permitted to flow through said container into said reservoir.

In testimony whereof, I have hereunto affixed my signature.

GEORGE HILGER.